July 12, 1955

J. W. McGEE 2,712,714

FROST PREVENTING DEVICE

Filed Jan. 24, 1950

TO FUEL TANK
TO FLUID TANK

INVENTOR.
JAMES W. McGEE
BY
*J. F. Cuneo*
ATTORNEY

July 12, 1955          J. W. McGEE          2,712,714

FROST PREVENTING DEVICE

Filed Jan. 24, 1950          6 Sheets-Sheet 2

INVENTOR.
JAMES W. McGEE
BY
*J. F. Cuneo*
ATTORNEY

July 12, 1955  J. W. McGEE  2,712,714
FROST PREVENTING DEVICE
Filed Jan. 24, 1950                                    6 Sheets-Sheet 3

INVENTOR.
JAMES W. McGEE
BY
J. F. Cuneo
ATTORNEY

July 12, 1955  J. W. McGEE  2,712,714
FROST PREVENTING DEVICE
Filed Jan. 24, 1950  6 Sheets-Sheet 5

INVENTOR.
JAMES W. McGEE
BY
*J. F. Cuneo*
ATTORNEY

July 12, 1955

J. W. McGEE 2,712,714

FROST PREVENTING DEVICE

Filed Jan. 24, 1950

INVENTOR.
JAMES W. McGEE
BY
J. F. Cuneo
ATTORNEY

United States Patent Office 2,712,714
Patented July 12, 1955

2,712,714
FROST PREVENTING DEVICE
James W. McGee, Ontario, Calif.
Application January 24, 1950, Serial No. 140,330
13 Claims. (Cl. 47—2)

This invention relates to frost prevention means for growing plant life such as orchards and groves and is particularly directed to means for preventing frost injury to trees, shrubs and other vegetation, capable of circulating warm air around and above the trees or other plants.

An object of my invention is to provide a device that is capable of drawing down warmer air from the upper strata above the tree tops and mixing it with cold air around the trees near the earth's surface to raise the temperature of the cold air, even though such warmer air may be at some distance above the tops of the trees and the device.

Another object of my invention is to provide a positive, economical, and effective device for insuring the circulation of warm air around trees or plants regardless of the temperature of the air either at ground level or at higher levels.

Further object of my invention is to provide a device capable of efficiently heating the air from the upper strata before mixing this air with the cold air near the earth's surface, which surrounds the trees, etc.

A related object of my invention is to provide a means whereby the warmer air that is discharged from the device is caused to remain close to the ground instead of rising rapidly to the upper levels.

It is well known that as long as the temperature of the air surrounding trees, shrubs, etc., is prevented from dropping below the freezing point, injury to the trees and fruit can be substantially prevented even though the prevailing temperatures in adjacent region are considerably below the freezing point.

Several forms of devices have been employed to achieve this object, the most common being the smudge pot. The use of smudge pots is not desirable for the following reasons: a large number of pots are required to effectively protect a given area; smudge pots consume a large quantity of fuel, little of which accomplishes any useful result, since combustion is usually incomplete; close supervision is required to insure their successful operation; and the surrounding air for miles around the scene of operation is polluted with dense black clouds of unburned soot and carbon which hang close to the ground long after the necessity for firing has ceased.

Another form of frost preventing device which has also been employed but which has not been too satisfactory is an arrangement comprising counter revolving propellers similar to those used on airplanes. These are mounted on a tower of sufficient height, to permit them to create an artificial breeze through and above the trees. The theory on which these propellers operate is that a moving mass of air is less likely to freeze growing fruit and plants than still air. However this is true only if the air mixture delivered by the propellers is above the freezing temperature. Many times there is no great differential between the air at ground level and that at the level at which the propellers operate in which case the device merely circulates freezing air. Even assuming that the air at the level of the revolving blades is somewhat warmer than the air at the ground level, the propellers will normally pull up a portion of the cold air that is near the ground, and if this ground level air is substantially below the freezing temperature it will tend to lower the temperature of the slightly warmer air from the region at the level of the propellers and often cools it sufficiently to lower its temperature below freezing point before it reaches the trees. In event that the air both at the level of the blades and at the ground level is below the freezing point, this propeller device will serve no useful purpose and if operated may cause the trees to freeze more quickly than if the air were left uncirculated.

I overcome the above objections and accomplish the objectives set forth above by utilizing in an orchard or other planted area, a device or devices according to this invention located at a predetermined location or locations. Preferably my device takes the form of a means for pulling downward warm air from higher strata and continuously forcing a current of such air over the orchard in a rotative progression, thereby permitting the air stream leaving the device, to reach all portions of the orchard within the range of the exhaust. If desired the device may also be made to operate in such a manner that the exhausted air stream is made to oscillate through an arc of 180° more or less, instead of making a complete revolution.

The device according to my invention comprises essentially a vertical stack or duct means for drawing in the air from the upper levels, some of which may be a considerable distance above the entrance to the duct; means for converting the perpendicular flow of the air into a substantially horizontal flow; an exhaust nozzle; blower means located within the duct for sucking in and compressing the upper level air; a heating device for supplying heat to the air passing through the duct, when required; means for rotating the entire duct or causing it to oscillate; means for supplying fuel and other fluids as well as electricity from the stationary portion of the device to the heating device and injector orifices located within the rotating or oscillating duct assembly; and elevating means for supporting the duct assembly at any desired elevation above the ground.

A feature of my novel device is its ability to pull down the air that lies a considerable distance above the top of the duct. Under normal conditions the temperature of the air forty to fifty feet above the ground will be approximately ten degrees higher than the temperature of the air at the ground level. My device is capable of taking advantage of this condition and as a result it is usually unnecessary to add additional heat by means of the heating device.

Another feature of my device is the arrangement by which fuel, other fluids, and utilities are supplied to moving connections from stationary tanks, pumps, and conduits. These moving connections are connected to the rotating or oscillating duct assembly by suitable conduits to the fluid consuming means located in the rotating or oscillating duct assembly.

A further feature of my device is that it is provided with a heating arrangement capable of making effective use of all of the heat energy in the fuel whenever it becomes necessary to warm the air flowing through the duct. The heating device furthermore uses a relatively small amount of fuel as compared to a smudge pot installation, that is, approximately 5% of the amount of fuel required to operate a sufficient number of pots to protect the same area.

An advantage of my device is that the combustion of the fuel takes place without the formation of soot or carbon. This is partly due to the fact that the fuel is preheated and placed under pressure while at the same time sufficient air has been added to the pressurized fuel before it is supplied to the burner.

Another advantage resides in the fact that all portions of the orchard, etc., are heated uniformly thereby eliminating cold spots at any portion of the area.

A particular advantage of my device is that it requires a minimum of supervision; one person being capable of operating and servicing several of these machines without great effort. If desired the device may be made completely automatic by employing thermostatic controllers capable of operating the driving elements.

The invention will be better understood with reference to the accompanying drawings and detailed description in which.

Figures 1, 1A:
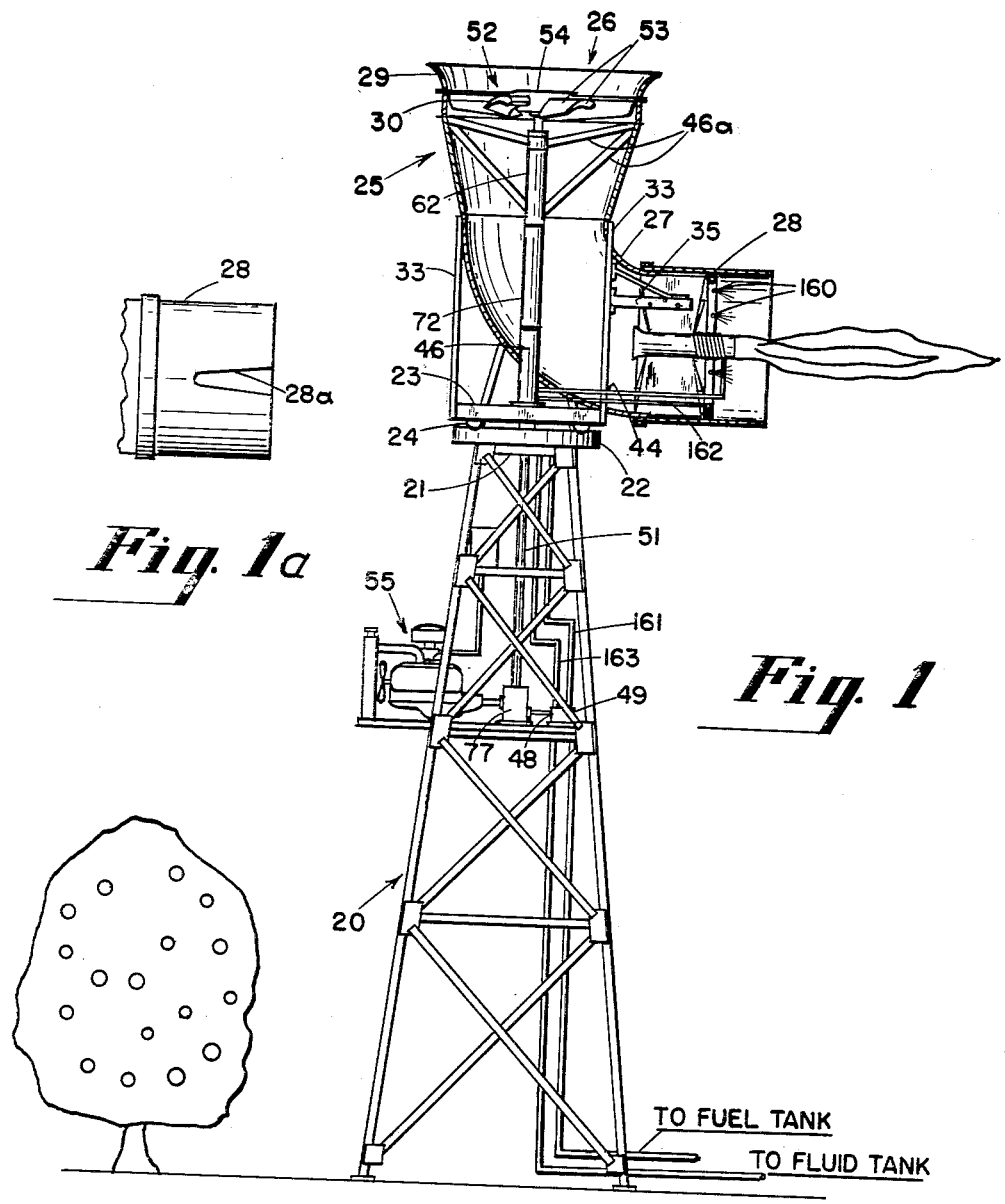
Fig. 1 is a view of the assembled device showing the duct in cross-section.
Fig. 1a is a bottom plan view of a modification of the discharge portion shown in Fig. 1.

The device shown in the drawings comprises a tower 20 which can be made of any material, type of construction and height desired. The top of the tower is provided with a frame 21 upon which there is supported a circular track-like means 22. Track means 22 may be of any suitable construction and is shown by way of example as a circular channel. The flanges of channel forming track means 22 are shown as pointing toward the center, the flanges may also be made to point outwardly if desired.

A platform 23 is mounted on a plurality of flat or flanged wheels 24 which rotate on top of the upper flange of track-like member 22. The flange of the wheels 24 rides either against the side of channel member 22 or against the side of the upper flange of channel member 22 depending upon which way the wheels are mounted.

A duct 25 comprising an upper or inlet portion 26, having its longitudinal axis disposed substantially vertically, a central portion 27 for changing the direction of the air flow, and an outlet portion 28 having its longitudinal axis substantially horizontal, is mounted securely to platform 23 preferably in such a manner that the longitudinal axis passing through the center of the vertical entry portion passes approximately through the center of the circular track-like means 22.

Duct 25 is shown in detail in Fig. 1 by way of example. This duct includes a flared entry portion 29 which has its largest diameter at its upper end and its smallest diameter at its lower end. A cylindrical portion 30 having the same diameter as the lower end of flared portion 29, is connected to the lower end of flared portion 29. Cylindrical portion 30 is preferably made relatively short. The lower end of cylindrical portion 30 is connected to the upper end of a longer vertical portion 31. Section 31 is shown in the drawings as a frustum of a cone, however, this section may also be made cylindrical if desired. In the drawings the lower end of cylindrical portion 30 is secured to the upper, or largest end of the frustum 31.

The lower, or smaller end of frustum 31 is connected to the upper end of an elbow 27. Elbow 27 may or may not be made uniform in diameter throughout its entire length. The contour of elbow 27 depends upon the velocity which it is desired to impart to the gases flowing through this portion of the duct. Likewise, the elbow 27 shown in the drawings is substantially a 90° elbow, however, any other angle that is desired maybe used. The opposite end of elbow 27 is connected to the discharge nozzle 28 which is shown to be cylindrical for convenience. The combined members 29, 30, and 31 constitute the vertical portion of the duct and the length of any or all sections may be adjusted to place the entry opening at any desired height above the tower. Discharge nozzle 28, as well as elbow 27 may also be of any desired length.

In Fig. 1a the discharge nozzle 28 is provided with a slot 28a located at the bottom of the cylindrical nozzle. This slot 28a permits the air leaving the discharge nozzle to reach trees, etc., that are relatively close to the tower support. The air stream would otherwise pass over the top of trees in the immediate vicinity of the tower.

The combined sections forming the duct 25 are supported on platform 23 in any convenient manner. In the drawings the upper portion of the elbow 27 is provided with a circular straplike member 32, to which there are secured a plurality of braces 33. The lower ends of the braces 33 are secured to the sides of platform 23. The upper and lower ends of the braces may be welded, brazed, or bolted to strap 32 and platform 23. The braces located on the sides and back side of the duct are preferably located on the outside of the duct. The braces which support the front of the duct, that is the side from which the discharge nozzle 28 extends, are shown for convenience, as secured to platform 23, pass through the duct at elbow 27, emerge from the upper side of the elbow 27 and are secured to the strap like member 32. The illustrations show the duct elbow 27 resting on the platform 23, however, the bottom of the elbow may be suspended above the platform if desired.

Figure 2:
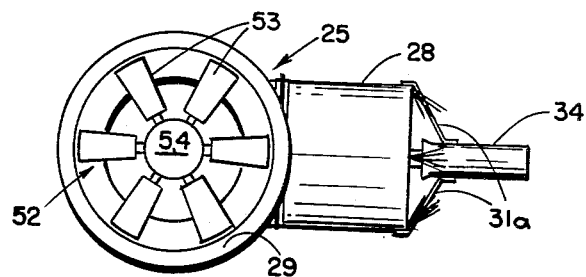
Fig. 2 is a top plan view of the duct shown in Fig. 1, having the burner located outside the discharge portion of the duct.
Figure 3:
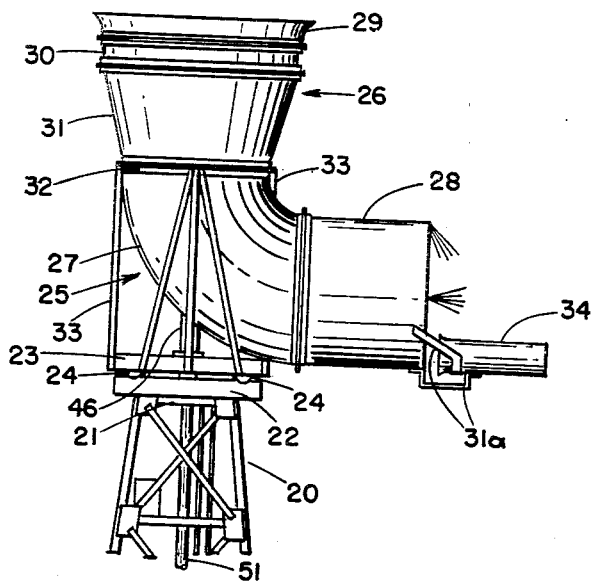
Fig. 3 is a side plan view of the arrangement shown in Fig. 2.

A burner device 34 is preferably located within or at the discharge end of the lateral or discharge nozzle portion 28 of the duct 25. This burner is shown in Fig. 1 as supported inside the duct by means of a bracket arrangement 35, which is securely attached to the brace 33 passing through elbow 27. In Figs. 2 and 3 the burner is secured to the lower lip of the outlet portion 28 and held in place by brackets 31a.

Figure 7:
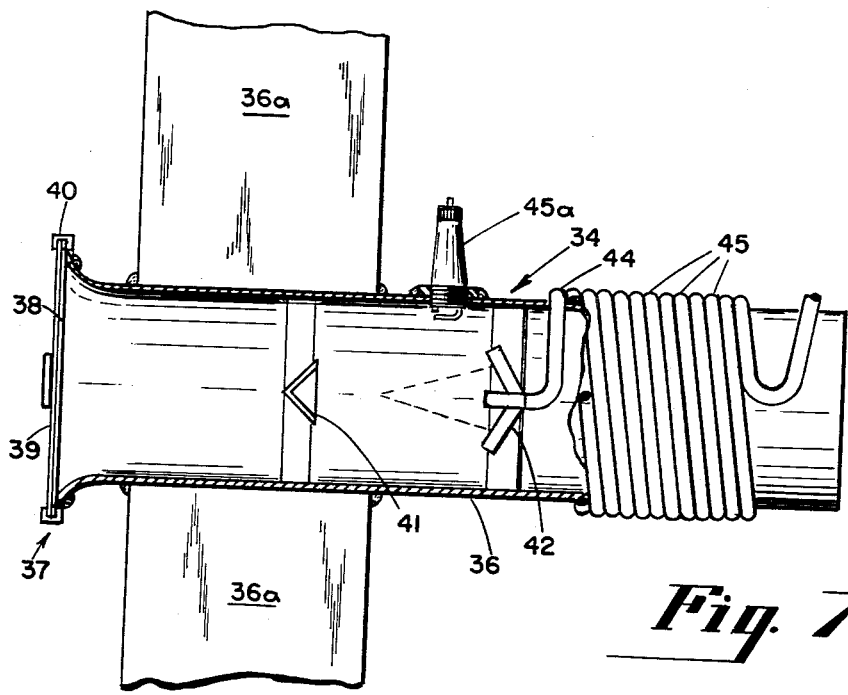
Fig. 7 is a cross-section view taken through the center of the burner shown in Figs. 1, 2, and 3.
Figure 8:
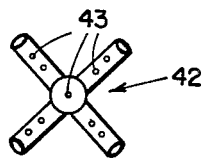
Fig. 8 is a front plan view of one form of fuel injector.
Figure 9:
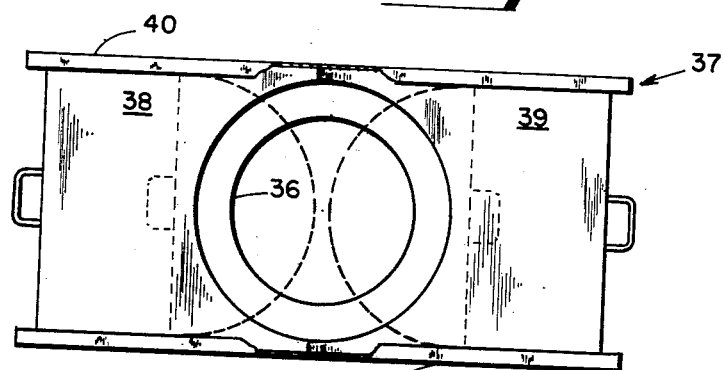
Fig. 9 is a front plan view of the air inlet control shown at the left end of Fig. 7.
Figure 12:
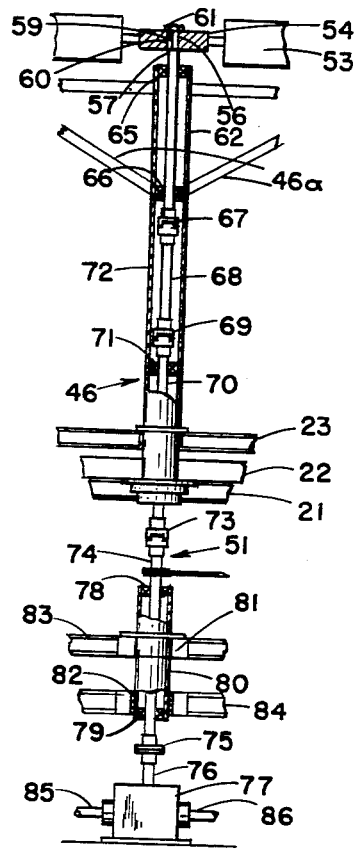
Fig. 12 is a view partly in cross-section showing one embodiment in which the shaft may connect the power source with the blower and rotating arrangement.
Figure 10:
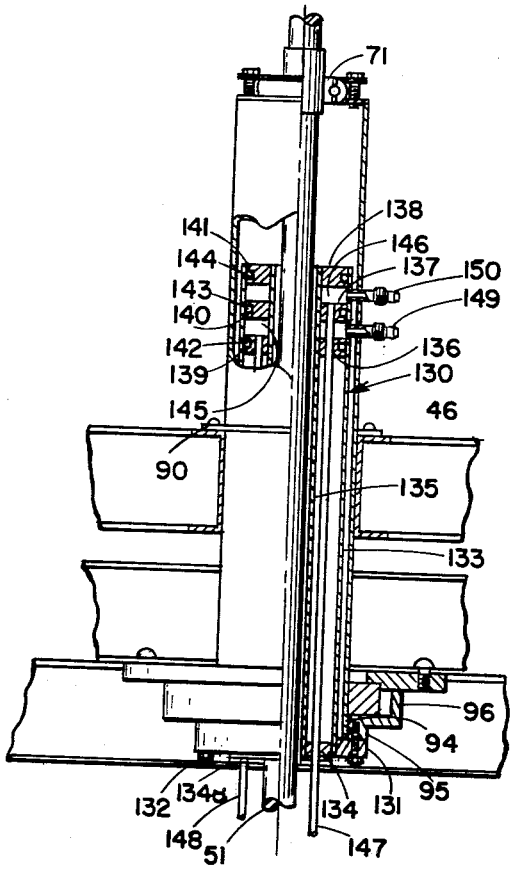
Fig. 10 is an alternate construction of a device similar to the one shown in Fig. 6, designed to permit easy removal of the device without disturbing the rest of the assembly.

Burner 34 is shown in greater detail in Fig. 7. The burner comprises a cylindrical shell 36 provided with fins 36a and an air inlet control 37 located preferably near its inlet end. One embodiment of the inlet control 37 is shown in detail in Fig. 9, by way of example. This drawing shows the control 37 made in the form of an enlarging orifice formed by a pair of crossing plates 38 and 39 mounted on a support 40 wherein they can slide. Support 40 in Fig. 7 is shown secured to the inlet end of the burner shell 36. This may be done by any suitable means such as welding, brazing, etc. The inner ends of plates 38 and 39 are cut so that they form a hole of increasing area as the plates are pulled away from each other in the support 40. At the extreme outward position the plates uncover the entire circular area of cylindrical shell 36. Downstream of the air inlet control 37 there is located a baffle 41 preferably positioned in the center of the cylindrical shell 36. A fuel injector 42, one form of which is shown in Fig. 8, is positioned downstream from baffle 41. Fuel injector 42 is provided with orifices 43 which are positioned to converge towards each other, at a point slightly downstream from baffle 41. A fuel line 44 supplies fuel to the fuel injector 42 from the rotating connection within the duct. This fuel line passes through the side of the cylindrical shell 36 and is preferably wrapped around the outside of said shell a number of times as shown in Fig. 7. This plurality of convolutions 45 serve to preheat the fuel before it enters the injector 42 and at the same time places the fuel under still greater pressure than that at which it arrives to the preheater section 45. This permits it to blend quickly with the air stream passing into the burner shell 36 through the inlet control 37 and allows the fuel to burn substantially without smoke. Ignition of the fuel may be accomplished by any suitable igniting device such as a spark plug 45a or equivalent electrical means such as a hot spot, etc.

Duct 25 is primarily supported by a hollow vertical composite tube 46 which is located within the duct in such a manner that its longitudinal axis is in the same position as the longitudinal axis of the vertical portion 26 of duct 25. A plurality of braces 46a extend between the upper portion of composite tube 46 and the inner wall of the duct 25. These braces are secured to the duct and the tube by any suitable means such as brazing, welding, riveting or bolting. Tube 46 intersects the elbow 27 of the duct 25 and emerges from the lower side of the elbow continuing along the same longitudinal axis. Tube 46 may be secured to the duct elbow 27 at all points of intersection if desired, although this is not essential.

Tube 46 houses an adapter arrangement 47 which permits stationary connections from the pumps 48 and 49 and the electrical source 50 to deliver fluids under pressure and electricity to the moving duct 25 as later described. Tube 46 also houses the main shaft 51 that drives a blower or fan-like arrangement 52 which, in the drawings, is preferably shown as located within the vertical portion 30 of the duct. This blower or fan 52 substantially fills the entire area as shown in Figs. 1 and 2.

Figure 11:
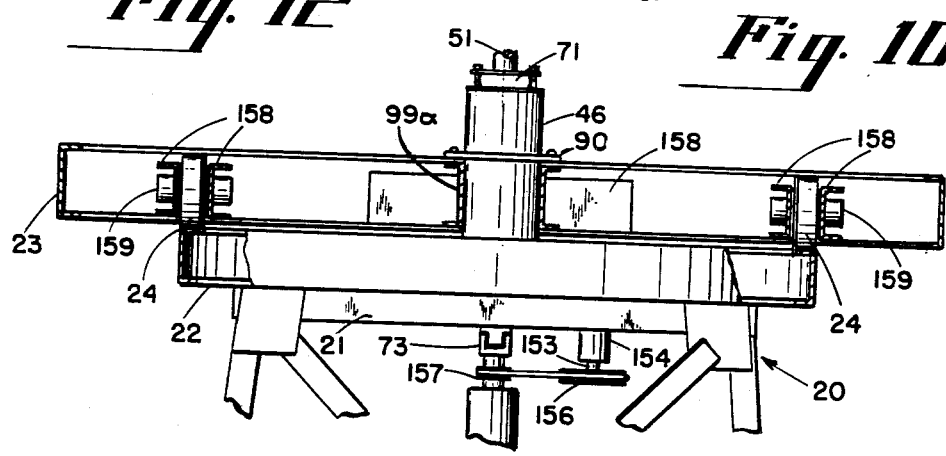
Fig. 11 is a cross-section view taken on the line 11—11 of Fig. 4 showing the manner in which the duct supporting platform is mounted on wheels which ride on the track.

Blower or fan 52 comprises a plurality of blades 53 connected to a hub 54 as shown in Figs. 1 and 2. Hub 54 is connected to a power source 55 by suitable shafting, etc., 51. This assembly is described later in detail and is illustrated by Fig. 11. The power source shown in the drawing is a gasoline engine, however, any other conventional form of power unit such as for example a diesel engine, electrical motor, water motor, etc., may be employed.

One way in which the power source may be connected to the hub 54 of blower 52 is shown, by way of example in Fig. 11.

The hub end of shaft 51 is reduced in diameter for a short distance 56 thereby forming a shoulder 57. The upper end of this reduced diameter portion of the shaft is threaded for a short distance 58 from the end of the shaft. The reduced portion 56 is preferably provided with a key-way 59 which engages a corresponding key-way 60 cut in hub 54. A bolt 61 secures the keyed hub to the shaft. The shaft below hub 54 enters a bearing support member 62 which is the upper member of the composite tube support 46. Braces 46a previously described are preferably attached to supporting member 62. Bearing support 62 is provided with two bearings 65 and 66 located at each end of the supporting member 62. Shaft 51 passes through these bearings. Shaft 51 continues for a short distance beyond the lower end of bearing support 62 and is provided at the lower end with a universal joint 67. Composite shaft 51 then continues from universal joint 67 for any desired distance 68 and is provided at the opposite end with a second universal joint 69. The shaft 51 then continues below universal joint 69 for a distance 70 to a point below platform 21. The upper portion of section 70 of shaft 51 is supported by a self-aligning bearing 71 that is bolted or otherwise secured to the top of the lowest and original element of composite tube 46 as shown in Figs. 1, 10, 11, and 12. A cylindrical housing section 72 of approximately the same diameter as the bearing support unit 62 and lower original tube 46, encloses a pair of universal joints 67 and 69, as well as shaft element 68, and self-aligning bearing 71.

The lower end of member 70 of shaft 51 is provided with a universal joint 73. The adjoining portion 74 of the shaft 51 then continues downward and terminates in a coupling 75. The other end of coupling 75 is connected by a short shaft portion 76 which enters a gear box 77. The portion 74 of shaft 51 is supported by a pair of bearings 78 and 79 mounted in a bearing support 80 which in turn is supported by a pair of straps 81 and 82 attached to braces 83 and 84 which are secured to tower 20 at any convenient location.

Power is supplied by the motive source 55 through a shaft 85 which enters the gear box 77. Power may be taken from the gear box 77 through an auxiliary shaft 86, and fuel pump 48 and fluid pump 49 may be driven by shaft 86. In the drawings, Fig. 1 shows both the fluid and the fuel pumps combined within the same pump housing. The shaft assembly as described, is shown only by way of example. The length of the shaft, number of universal joints, and the number of bearings may be adjusted as desired and will depend in part upon the location and nature of the motive power used. For example if the power source is closely situated with respect to platform 21, a number of the members described above may be dispensed with, however, if the power source is at the foot of the tower then additional portions and elements may be required.

Figure 6:
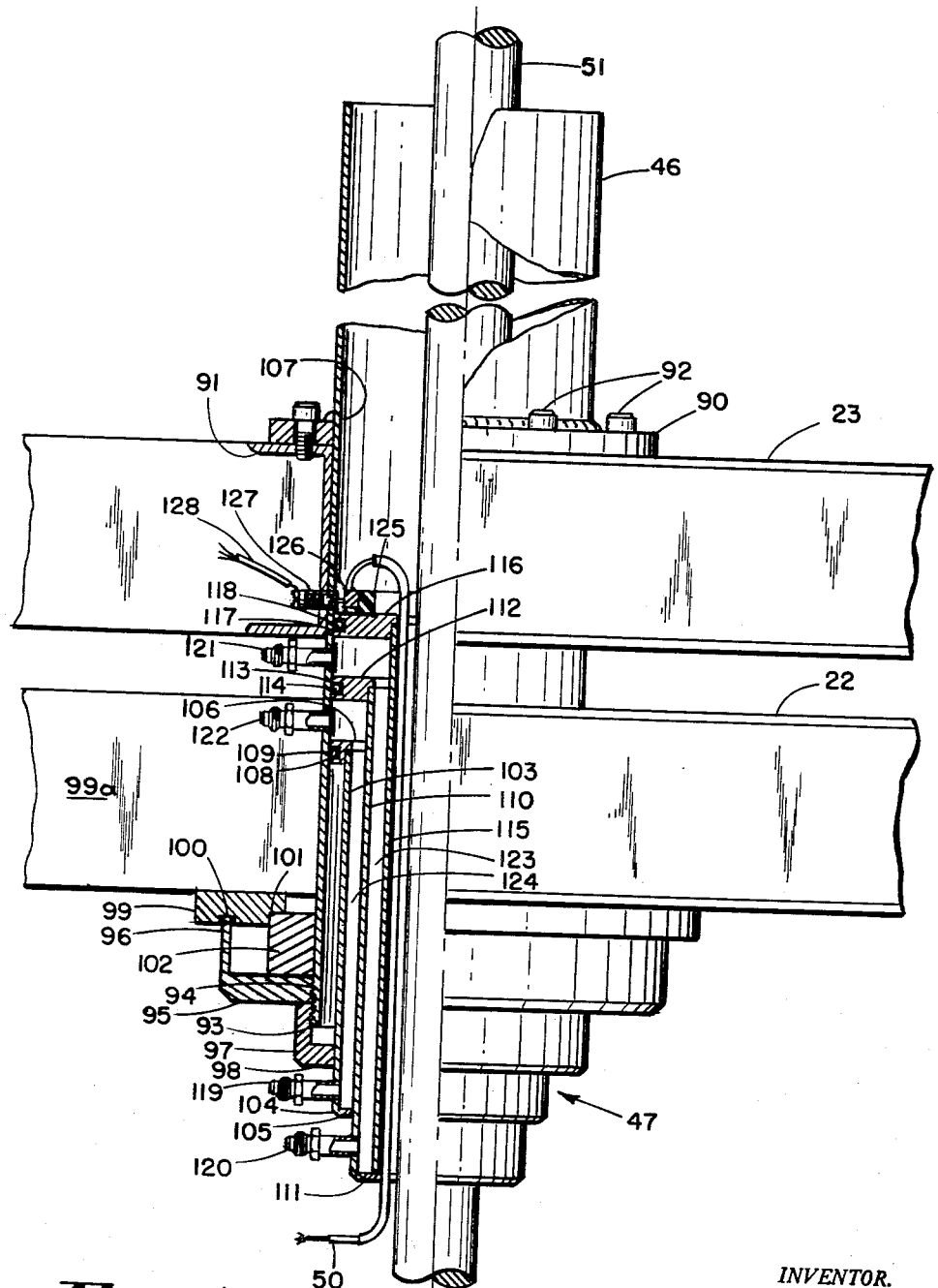
Fig. 6 is a view partly in cross-section showing one embodiment for delivering the fuel, fluid, and electricity to appropriate elements in the rotating or oscillating duct.

One form of construction for the adapter 47 which supplies fuel, fluid and electricity to the moving duct 25 from the lower stationary pipes and connections is shown by way of example in Fig. 6 and is constructed as follows:

The outer surface of tube 46 is provided with a flange 90 which is preferably welded or otherwise permanently attached to the tube 46. Flange 90 is secured to the upper surface of channel members 91, located in the central portion of platform 23, by means of a plurality of bolts 92. This flange 91 supports the composite tube 46 from which is supported the duct 25. Channel members 91 are in turn secured to the sides of platform 23 by any suitable means, such as bolting, welding, brazing, etc.

Tube 46 continues at uniform diameter to a point substantially below the track-like means 22 located on top of the tower brace 21. The lower end 93 of tube 46 is provided with external threads 94. A large annular nut 95 is provided with a vertical cylindrical element 96. Annular nut 95 is threaded on threads 94. Annular nut 95 is then locked in place by a second annular nut 97 provided with a flange 98 at its lower end, directed toward the center.

The lower central portion of track like member 22 is provided with an annular guide ring 99, attached to the track member 22 by braces, 99a, which are welded, bolted or otherwise attached thereto. The upper edge 100 of vertical cylindrical element 96 rests against the annular guide ring 99. The lower inner edge of guide ring 99 is provided with an annular step 101. An annular 102, preferably constructed of some frictionless material such as graphite, bronze, etc., having its inner diameter conforming to the inner diameter of tube 46 and its outer diameter corresponding to the diameter of annular step 101, is made of sufficient thickness to rest against annular nut 95 and against the bottom of annular step 101 when the vertical cylindrical element 96 is resting against the annular guide ring 99. A second tube 103 having a diameter corresponding to the inner diameter of flange 98, and concentric with tube 46, passes through the flange 98 with sufficient clearance. End 104 of tube 103 is provided with a flange 105 which extends towards the central axis of tube 46 for a short distance. The upper end of tube 103 is secured to a wide annular external flange 106 which is made sufficiently large in diameter to just touch the inner wall 107 of tube 46. Annular flange 106 is provided on its outer surface with a groove 108 in which is seated an O-ring 109.

Flange 105 continues for a short distance and then is secured to a third tube 110, smaller in diameter than tube 103 by welding, brazing or other suitable means. Tube 110 is also concentric with tubes 46 and 103 and extends above and below tube 103 a substantial distance. The lower end of tube 110 is provided with a flange 111 that extends toward the central axis of tube 46. To the external upper end of tube 110 there is attached an annular flange 112 of substantial thickness. The outer diameter of flange 112 is substantially the same diameter as the inner wall 107 of tube 46. Flange 112 is provided with a groove 113, and an O-ring 114 is seated in the groove.

The lower end of a fourth tube 115, smaller in diameter than tube 110, and concentric with tubes 46, 103 and 110, but larger in diameter than shaft 51, is welded to flange 111. Tube 115 extends a substantial distance above the end of tube 110. The outer portion of the upper end of tube 115 is attached to an annular flange 116 of substantial thickness, the outer diameter of flange 116 is made substantially the same diameter as the diameter of the inner wall 107 of tube 46. The outer surface of flange 116 is provided with a groove 117, and an O-ring 118 is inserted in the groove.

A nipple 119 is attached to the outer surface of the lower projecting portion of tube 103 by any suitable means, such as welding, brazing, threading, etc. A second threaded nipple 120 is attached in a similar manner to the outer surface of the lower projecting portion of tube 110. These two nipples form the fixed connections of the assembly. The outer surface of tube 46 is provided with a third threaded nipple 121 secured in a manner similar to nipples 119 and 120, at a position between the lower surface of flange 116 and the upper surface of flange 111.

A fourth nipple 122 is secured to the outer surface of tube 46 in any of the manners described above and is positioned between the lower surface of flange 111 and the upper surface of flange 106.

In this manner fluid entering rigid nipple 120 is delivered through a conduit 123 to the rotating outlet nipple 121, and fluid entering rigid nipple 119 is delivered through a conduit 124 to the rotating outlet nipple 122.

On top of flange 116 there is secured, by any suitable means such as riveting or bolting, an annulus 125 made of any suitable electrical insulating material such as hard rubber, Formica, etc. Annulus 125 has an inner diameter that is larger than the diameter of tube 115 and has an outer diameter that is smaller than the inner diameter of tube 46. The upper outer edge of annulus 125 is provided with a step-shaped groove in which there is inserted an annulus constructed of electrical conducting material 126 which serves as a commutator ring, and may be made of material such as copper, brass, etc.

An insulated conductor wire 50 is attached to this commutator annulus 126 and passes to the outside through the space formed between the tube 115 and the shaft 51. This conductor emerges from the end of tube 115 and may be connected to any suitable source of electrical energy. An insulated brush arrangement 127 establishes continuous contact between the outer terminal on tube 46 and the commutator 126. A wire 128 completes the connection between brush 127 and the electrical element 45a.

An alternate construction for the adapter 47 which may be used in place of the device just described is a removable type of adapter 130. This adapter is constructed as follows:

The lower end of tube 46 is provided with external threads 94 as before. The large annular nut 95 is again provided with a vertical element 96 and is attached to threads 94. This nut is held in place by an annular ring 131 which is held by bolts 132 drilled into annular nut 95. The inner diameter of annular ring 131 is provided with an internal tube 133 which is smaller in diameter than the inner diameter 107 of tube 46 and is secured to ring 131 by threading, brazing, welding or other suitable expedient.

The lower end of tube 133 is provided with an internal annular plug 134 whose inner diameter is larger than the diameter of shaft 51. Plug 134 is made slightly smaller in its outer diameter than tube 133, in order to permit tube 133 to rotate around it. A second tube 135 proportioned to fit snugly into the inside bore of annular disc 134, and having an inner diameter larger than the diameter of shaft 51, is secured to annular disc 134 by means of brazing, welding, etc. Tube 135 and disc 134 are supported by a bracket 134a which is secured in turn to the frame work of the tower. Tube 135 extends upwardly from disc 134 a distance equivalent to the length of tube 133. The upper portion of tube 135 is provided with three or more wide flanges 136, 137 and 138 each having a respective groove 139, 140 and 141 in which there are seated O-rings 142, 143 and 144. Flanges 136, 137, and 138 securely attached on their inner edge to tube 135 so as to form two or more annular channels 145 and 146, depending upon the number of flanges employed.

A small tube 147 passes through annular disc 134 at any convenient point and extends into the first annular channel 146. Tube 147 is either threaded, welded or brazed to flange 137 and passes through flange 136. Tube 147 is welded or brazed to flange 136 to prevent channel 145 from leaking. A second small tube 148 passes through annular disc 134 at any convenient point and extends into annular channel 145. Tube 148 may be threaded to flange 136, or it may be welded or brazed to it after passing through the flange.

The wall of tube 133, at the location of annular channels 145 and 146, is provided with nipples 149 and 150 which enter channels 145 and 146 respectively. Nipples 149 and 150 may be either threaded, welded or brazed to tube 133 and passed through corresponding clearance holes in tube 46.

In this construction only two sleeves are required. Fuel is introduced by tube 147 into annular channel 146 and escapes through nipple 150, while any other desired fluid such as water, gas, etc., may be introduced by small tube 148 into annular channel 145 and discharged through nipple 149. Leakage from either annular channel is prevented by the O-rings in the grooves on the face of the adjoining flanges 138 and 137 in the case of channel 146, and flanges 136 and 137 in the case of channel 145. Additional channels may be easily created by employing more than three flanges with additional entry conduits to supply these other channels thus formed.

One advantage of this construction is that the entire adapter may be easily removed without disturbing the tube 46 or any of the rest of the permanent assembly, by merely removing the bolts 132 opening the shaft 51 and slipping the assembly out of supporting tube 46.

For causing the duct 25 and platform 23 to move on the track member 22 there is provided a large gear, pulley, or equivalent device 151 which is securely attached and centered to the lower surface of platform 23. This gear or other device is meshed, or operates in conjunction with a small gear, or corresponding element 152. Gear 152 is mounted on a shaft 153 which is supported by bearing support 154. This in turn is supported by a brace 155 which is in turn preferably secured to a portion of the tower assembly such as for example track-like member 22. The lower end of shaft 153 is provided with a large gear, pulley, or similar device 156 which in turn meshes with or otherwise cooperates with a small gear, pulley, or other device 157 mounted on shaft 51. This gear, pulley, or other device 157 may be positioned on shaft 51 between universal joint 73 and bearing 78. Thus when the motive power is applied to shaft 51 by the gasoline engine, electric motor, or other driving means, shaft 51 will be rotated and will in turn operate the gear or other device 156 and shaft 153. Gear or other device 152 being mounted on the other end of shaft 153 will likewise turn and impart motion to the larger gear or equivalent mechanism 151 which is fixed to the platform 23 causing the platform to move and at the same time causing the wheels 24 to rotate on the track-like member 22.

Figure 4:
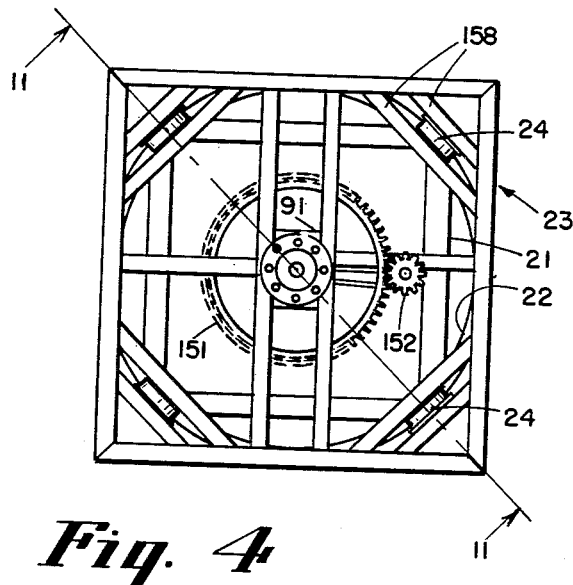
Fig. 4 is a top plan view of the turntable on which the duct is mounted.
Figure 5:
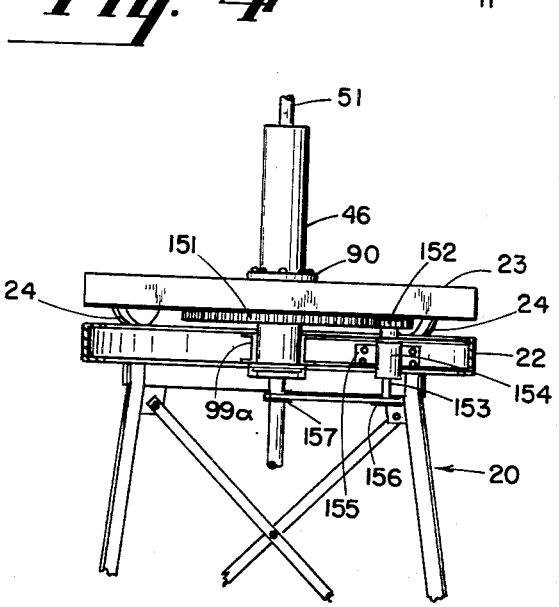
Fig. 5 is a plan view showing the top of the tower, track, and turntable arrangement, the track member being in cross-section.

One example of the manner in which platform 23 is mounted on track-like member 22 is shown in detail in Figs. 4 and 11. The supporting brackets 158 are secured preferably diagonally at the four corners of platform 23. These brackets 158 support axles 159 on which the flanged or flat wheels 24 turn. In Fig. 11 the wheels have their flanges on the inner side and ride against the side of the upper flange of the channel forming the circular track-like member 22.

Since hot or warm air has a tendency of rising to the higher elevations above the ground, it is often desirable to introduce into the hot air a fluid in gaseous form that will intermix with the air and add weight to it. This may be accomplished by introducing into the air before leaving the heater region of the duct, a heavy gaseous fluid such as water vapor, or a gaseous substance that is not injurious to plants, such as $CO_2$. This heavier than air fluid may be inserted in the manner shown in Fig. 1 by spraying the gas or gas forming liquid through orifices 160, spaced as desired around the perimeter of the duct and positioned to allow such fluid to become heated by the burner along with the air. This gaseous, or gas forming fluid is supplied to pump 49 placed under pressure and delivered through a connecting conduit 161 to whichever adapter is employed, and conducted to the orifices by a small pipe 162. Fuel is conducted from pump 48 to the adapter by a conduit 163 and is delivered from the adapter to the burner by pipe 44. In Fig. 2 the orifices 160 are positioned near the outlet of the discharge nozzle 28 since in this embodiment the burner is located outside the duct.

The way in which the device operates is as follows: The motive means 55 is placed in operation causing the drive shaft 85 to rotate and drive shaft 51 through gear box 77. The blades 53 of the blower are rotated at the desired speed and since they are slanted to cause them to draw in air into the duct 25, they will pull in air from above the duct and compress the air thereby forcing it through member 28 at elevated velocity and pressure. When necessary, heat is imparted to the air by burner 34 which is supplied with fuel delivered under pressure by pump 48 after it has passed through preheater 45. Combustion is started by energizing the electrical element 45a with electrical current passing through wire 50, commutator 126, brush 127 and wire 128. The rotating shaft likewise energizes the moving mechanism which operates the turntable and causes it to travel in an arc or circle upon the track 22.

If desired the fuel and fluid pumps may be driven directly by shaft 51 instead of through the gear box 77, or they may be powered by separate driving means.

The device according to my invention provides a positive means for adequately protecting growing plants, and particularly groves and orchards against frost damage, even though the temperature of the air surrounding the plants would normally be considerably below the freezing point.

Another advantage of my device is that it will operate without forming any obnoxious smoke or fumes and is capable of utilizing the principal portion of the inherent heat energy normally present in the fuel.

Another advantage of employing my device in preference to standard airplane type frost preventing machines is that since the propelling blades which compress the air and draw it into the duct are substantially enclosed, the blower operates with very little attending noise.

The descriptions of the various elements incorporated in the apparatus have been shown by way of example only and it is not intended that the invention shall be limited by these, but shall include all equivalent devices which would be apparent to one skilled in the art.

I claim:

1. A frost preventing device for protecting growing plant life comprising: a supporting structure adapted to extend substantially above the plant life to be protected and into the air layer normally overlying the ground air; a duct comprising a first conduit and a second conduit mounted on said supporting structure at the top thereof, said first conduit having an inlet at the upper end thereof adjacent said overlying air layer, the longitudinal axis of said inlet portion being substantially vertical and extending downwardly, said second conduit being connected to the lower end of said first conduit and having a discharge portion extending substantially laterally with reference to said first conduit; blower means for drawing air into the inlet of said first conduit and forcing said air through said second conduit; means for driving said blower means; said second conduit being adapted to direct air delivered to it by said blower means outwardly, above and downwardly onto the plant life to be protected; means on said supporting structure for movably supporting said duct including a track means on which said movable duct support can travel; and means for causing said duct support to travel on said track means, whereby said duct is caused to move about the longitudinal axis of said inlet portion and discharge air drawn in from the region above said inlet, uniformly outwardly and downwardly over the entire area covered by the plant life to be protected by said frost preventing device.

2. A frost preventing device according to claim 1, wherein the track means is arcuate.

3. A frost preventing device according to claim 1, wherein said track means is circular; and means for rotating said duct supporting means on said track, whereby said duct support and duct can rotate about said longitudinal axis of said first conduit and discharge air drawn in from the region above said inlet, uniformly outwardly and downwardly in a circular pattern over the area covered by the plant life to be protected.

4. A frost preventive device according to claim 1, including air heating means within said duct, said air heating means positioned downstream from said blower means; and means for supplying fuel to said air heating means, whereby heat from said air heating means can be applied to the air passing through said duct at a point downstream from said blower means.

5. A frost preventive device according to claim 4, including means for adding to the air stream passing through said duct, a gas that is heavier than air, before the air stream is discharged from said second conduit.

6. A frost preventive device for groves and orchards comprising: a supporting structure adapted to extend substantially above the plant life to be protected and into the air layer normally overlying the ground air; a duct comprising a first conduit and a second conduit mounted on said supporting structure at the top thereof, said first conduit having an inlet at the upper end thereof, adjacent said overlying air layer, the longitudinal axis of said inlet portion being substantially vertical and extending downwardly, said second conduit being connected to the lower end of said first conduit and having a discharge portion extending substantially laterally with reference to said first conduit; blower means for drawing air into the inlet of said first conduit and forcing said air through said second conduit, said second conduit being adapted to direct air delivered to it by said blower means outwardly, above and downwardly onto the plant life to be protected; means on said supporting structure for movably supporting said duct including a circular track means on which said movable duct support can travel; shaft means for driving said blower means; motive means for driving said shaft means; and transmission means connected to said shaft means and to said movable duct supporting means whereby rotation of the shaft means actuates said movable duct support on said track means and said duct is caused to rotate about the longitudinal axis of said first conduit and discharge air drawn in from the region above said inlet uniformly, outwardly and downwardly over the entire area covered by the plant life to be protected.

7. A frost preventive device according to claim 6, including burner means in the region of said discharge portion; movable, fuel supplying means secured to said movable duct support; fixed, fuel supplying means on said supporting structure for supplying fuel to said movable, fuel supplying means; conduit means for supplying fuel to said burner means from said movable, fuel supplying means; pressurizing means; conduit means for supplying fuel from said pressurizing means to said fixed fuel supplying means; transmission means connected to said shaft means for driving said pressurizing means; and conduit means for supplying fuel from a storage means to said pressurizing means.

8. A frost preventive device according to claim 7, including a fluid injector means in the region of said discharge portion for injecting therein a fluid heavier than air, and harmless to plant life; a movable, fluid supplying means secured to said movable duct support; a fixed, fluid supplying means on said supporting structure for supplying fluid to said movable, fluid supplying means; a second conduit means for supplying fluid to said fluid injector means from said movable, fluid supplying means; a second pressurizing means; a second conduit means for supplying fluid from said second pressurizing means to said fixed, fluid supplying means; transmission means connected to said shaft means for driving said second pressurizing means; and conduit means for supplying said fluid from a storage means to said second pressurizing means.

9. A frost preventive device for protecting growing plant life comprising; a supporting structure adapted to extend substantially above the plant life to be protected, and into the air layer normally overlying the ground air; a duct comprising a first conduit, an elbow portion and a second conduit mounted on said supporting structure at the top thereof, said first conduit having an inlet portion at the upper end thereof, adjacent said overlying air layer, the longitudinal axis of said inlet portion being substantially vertical and extending downwardly, the upper end of said elbow portion connected to the lower end of said first conduit, said second conduit having a discharge opening at one end, the opposite end of said second conduit connected to the other end of said elbow portion, said second conduit extending substantially laterally with reference to said first conduit; blower means for drawing air into the inlet of said first conduit and forcing said air through the discharge opening of said second conduit; means on said supporting structure for movably supporting said duct, including a track means on which said movable duct support can travel; shaft means for driving said blower means; motive means for driving said shaft means; and transmission means connected to said shaft means and to said movable duct support, whereby rotation of said shaft means actuates said movable duct support on said track means, causing said duct to move about the longitudinal axis of said inlet portion and discharge air drawn in from the region above said inlet, uniformly above, outwardly, and downwardly over the entire area to be protected by the frost preventive device.

10. A frost preventive device for groves and orchards comprising: a supporting structure adapted to extend substantially above the plant life to be protected and into the air layer normally overlying the ground air; a duct comprising a first conduit and a second conduit mounted on said supporting structure at the top thereof, said first conduit having an inlet at the upper end thereof, adjacent said overlying air layer, the longitudinal axis of said inlet portion being substantially vertical and extending downwardly, said second conduit being connected to the lower end of said first conduit and having a discharge portion extending substantially laterally with reference to said first conduit; blower means for drawing air into the inlet of said first conduit and forcing said air through said second conduit; means for driving said blower means; said second conduit being adapted to direct air delivered to it by said blower means outwardly, above and downwardly onto the plant life to be protected; means on said supporting structure for movably supporting said duct including track means on which said movable duct support can travel; and adapter means between said supporting structure and said movable duct support, whereby fluids from fluid supplying means on said supporting structure may be supplied to said duct while said movable duct support travels on said track means.

11. A frost preventive device according to claim 10, in which the adapter means comprises at least one nonrotating fluid carrying sleeve fixed at one end; a rotary fluid carrying sleeve being concentric with said nonrotating sleeve; a plurality of flange means extending between said nonrotating sleeve and said concentric rotating sleeve and attached to said nonrotating sleeve to form a fluid tight connection; packing means provided on said flanges in contact with said rotating fluid carrying sleeve whereby leakage is prevented between said nonrotating sleeve and said rotating fluid carrying sleeve; conduit means connected to said fluid supplying means on said supporting structure for introducing fluid into the region between adjacent flanges; and means for withdrawing fluid from the region between adjacent flanges through said rotating sleeve member.

12. A frost preventive device according to claim 10, in which the adapter means comprises a plurality of concentric nonrotating fluid carrying sleeves, each of said sleeves fixed at one end and spaced to form conduit means between each pair of adjoining sleeves; a rotary fluid carrying sleeve, said rotary sleeve being concentric with said nonrotating sleeves and larger in diameter than the largest of said nonrotating sleeves; flange means extending between the upper end of each of said nonrotating fluid carrying sleeves and said rotary fluid carrying sleeve, said flange means being attached to said nonrotating sleeves to form a fluid tight connection therewith; packing means provided on said flange means in contact with said rotary fluid carrying sleeve whereby leakage is prevented between said nonrotating fluid carrying sleeves and said rotary fluid carrying sleeve; means for introducing fluids into each conduit means formed between adjacent nonrotating sleeves at the lower end of said nonrotating sleeves; and means for withdrawing fluids through said rotary fluid carrying sleeve at the region on said sleeve between adjacent flange means.

13. A frost preventive device as in claim 10 wherein said adapter connection comprises at least one nonrotating fluid carrying sleeve fixed at one end and a rotary fluid carrying sleeve, the distal end of said non-rotating fluid carrying sleeve provided with packing means in contact with said rotating fluid carrying sleeve, whereby leakage is prevented between said non-rotating fluid carrying sleeve and said rotating fluid carrying sleeve.

References Cited in the file of this patent

UNITED STATES PATENTS

| 1,286,517 | Bradbury et al. | Dec. 3, 1918 |
| 1,317,959 | Cobb | Oct. 7, 1919 |
| 1,357,314 | Cobb | Nov. 2, 1920 |
| 1,389,989 | Ross | Sept. 6, 1921 |
| 1,437,149 | Minetti | Nov. 28, 1922 |
| 1,571,467 | Cobb | Feb. 2, 1926 |
| 1,639,257 | Cobb | Aug. 16, 1927 |
| 1,903,615 | Towt | Apr. 11, 1933 |
| 1,993,635 | Towt | Mar. 5, 1935 |
| 2,041,969 | Seymour | May 26, 1936 |
| 2,231,454 | Saxe | Feb. 11, 1941 |
| 2,332,524 | Nyden | Oct. 26, 1943 |

FOREIGN PATENTS

| 125,916 | Sweden | Aug. 30, 1949 |